United States Patent [19]
Mazurek

[11] Patent Number: 5,521,744
[45] Date of Patent: May 28, 1996

[54] DIMMABLE SAFETY MIRROR SUITABLE FOR MOTOR VEHICLES AND METHOD OF OPERATION

[75] Inventor: Niel Mazurek, Huntingdon Valley, Pa.

[73] Assignee: Mirror Systems, Inc., Pittsburgh, Pa.

[21] Appl. No.: 161,157

[22] Filed: Dec. 2, 1993

[51] Int. Cl.$^6$ .................................................. G02F 1/153
[52] U.S. Cl. ........................... 359/267; 359/876; 359/607
[58] Field of Search .................................... 359/265, 267, 359/892, 874, 876, 603, 607

[56] References Cited

U.S. PATENT DOCUMENTS

| | | |
|---|---|---|
| 3,280,701 | 10/1966 | Donnelly et al. . |
| 3,337,286 | 8/1967 | Wieszeck . |
| 3,614,210 | 10/1971 | Caplan . |
| 3,738,737 | 6/1973 | Mills . |
| 3,862,798 | 1/1975 | Hopkins . |
| 4,114,986 | 9/1978 | Marcus . |
| 4,161,653 | 7/1979 | Bedini et al. . |
| 4,200,361 | 4/1980 | Malvano et al. . |
| 4,201,451 | 5/1980 | Jacob . |
| 4,299,444 | 11/1981 | Romer . |
| 4,488,777 | 12/1984 | Bauer et al. . |
| 4,580,875 | 4/1986 | Bechtel et al. . |
| 4,623,222 | 11/1986 | Itoh et al. . |
| 4,660,937 | 4/1987 | Richardson . |
| 4,690,508 | 9/1987 | Jacob . |
| 4,696,548 | 9/1987 | Ueno et al. . |
| 4,701,022 | 10/1987 | Jacob . |
| 4,729,638 | 3/1988 | Shirai . |
| 4,741,603 | 5/1988 | Miyagi et al. . |
| 4,786,145 | 11/1988 | Demura et al. . |
| 4,799,769 | 1/1989 | Demura et al. . |
| 4,820,022 | 4/1989 | Demura et al. . |
| 4,917,477 | 4/1990 | Bechtel et al. . |
| 5,168,378 | 12/1992 | Black et al. . |

FOREIGN PATENT DOCUMENTS 2029343  3/1980  United Kingdom .

Primary Examiner—Georgia Y. Epps
Assistant Examiner—Thomas Robbins

[57] ABSTRACT

An embodiment of the present invention provides a mirror subassembly having a dimmable dichroic liquid crystal mirror on one side and a conventional mirror on the opposite side, and a mirror housing which permits mounting of the mirror to the housing in either a first or second positions. In normal operation, the mirror subassembly is mounted to the housing in the first position with the dimmable mirror as the viewing surface. The dimmable mirror can be caused to operate a high reflectance state or low reflectance state by electronic control. Upon power loss, which causes the dichroic liquid crystal mirror to revert to a low reflectance state, the mirror subassembly can be manually mechanically mounted to the housing in the second position with the conventional mirror surface of the mirror subassembly as the viewing surface.

20 Claims, 11 Drawing Sheets

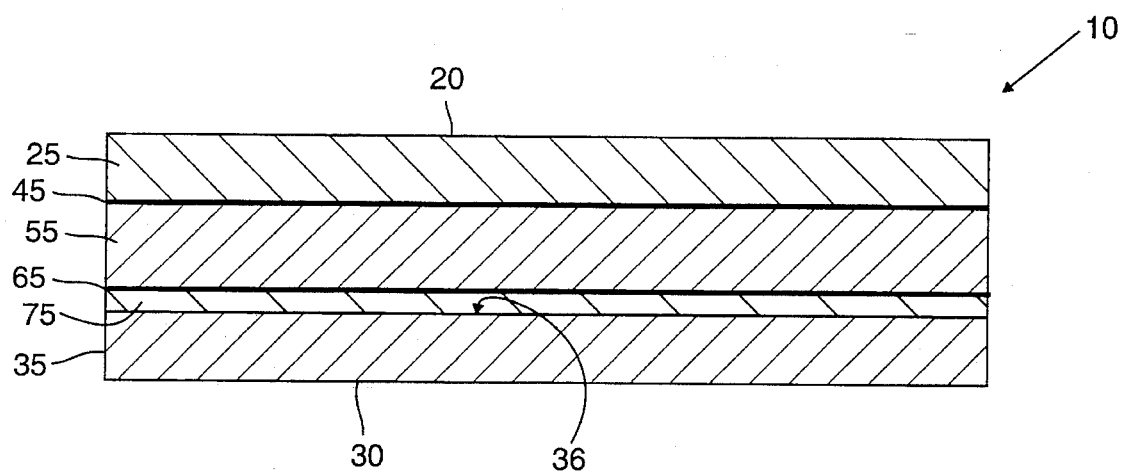
FIG. 1A
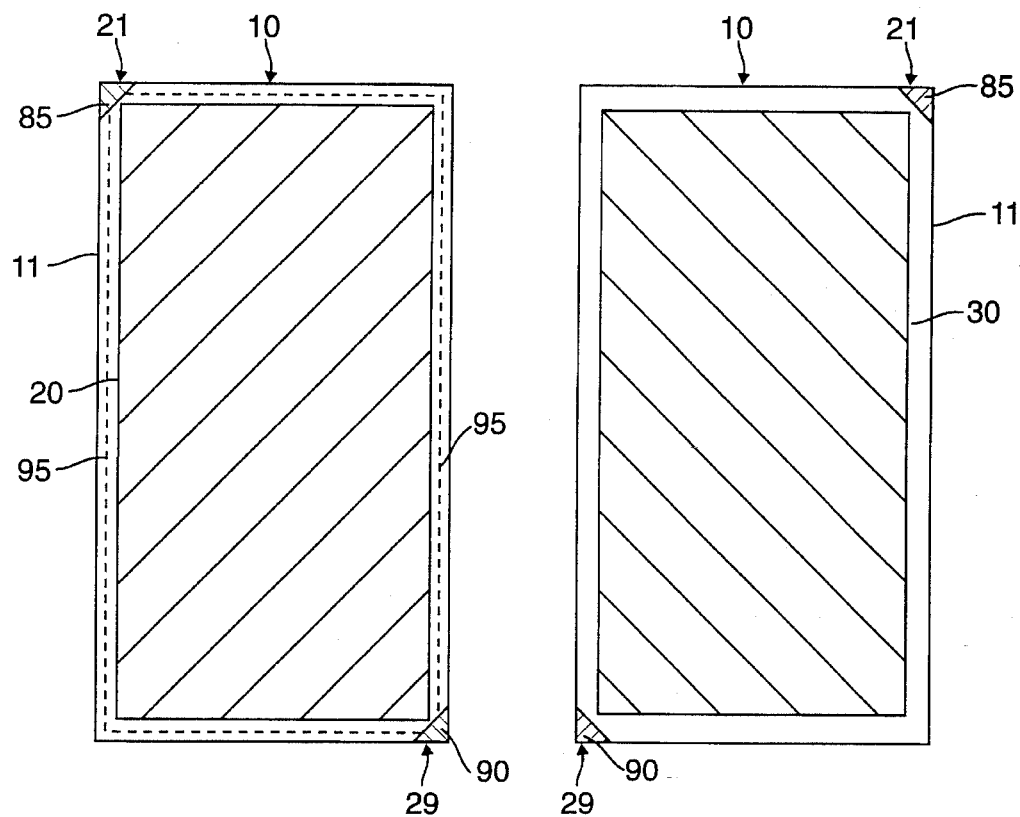
FIG. 1B  FIG. 1C

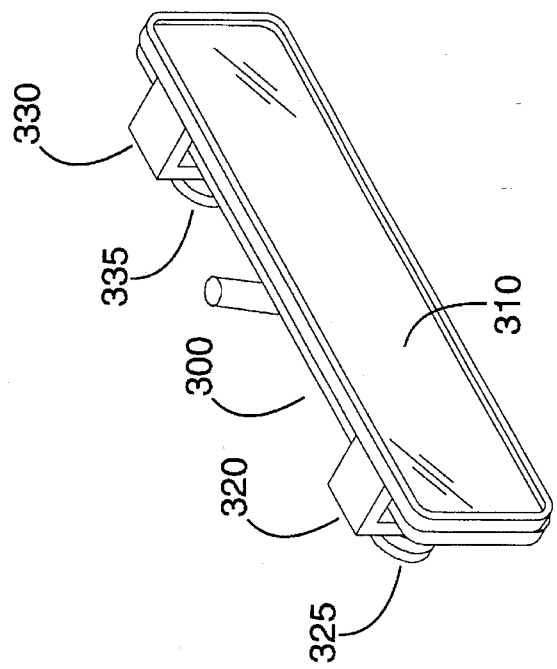
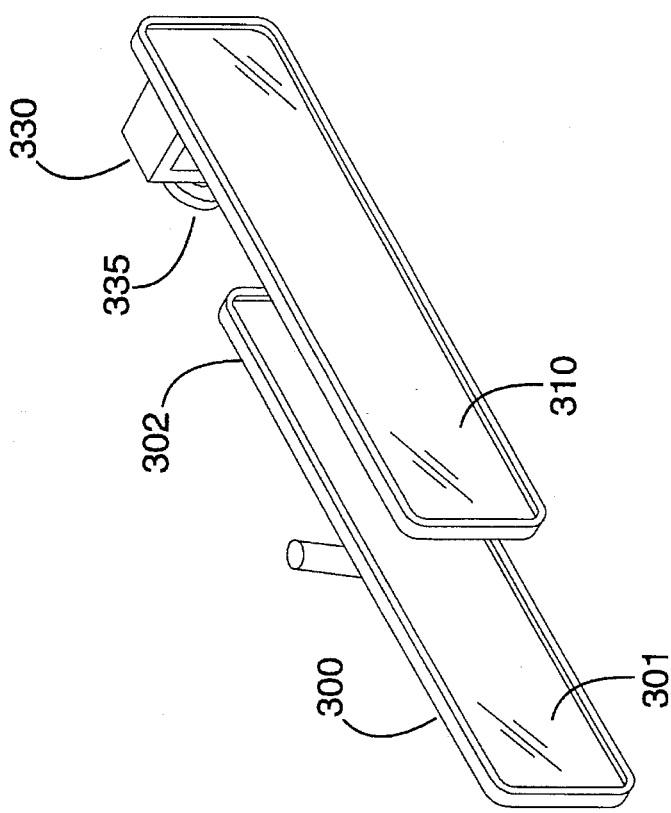
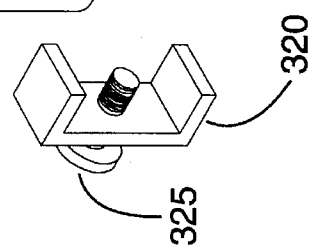
FIG. 4B
FIG. 4A

| Input $S_3$ Manual Dim On/Off Switch | Input $S_2$ Day/Night Switch | Input $S_1$ Comparator Output (Glare/No Glare) Detector | Output $S_{pow}$ (On/Off) | Operating Reflectance State of Mirror (Low [Dim] High) |
|---|---|---|---|---|
| On | -- | -- | Off | Low |
| Off | Day | -- | On | High |
| Off | Night | Glare | Off | Low |
| Off | Night | No Glare | On | High |

FIG. 7

DIMMABLE SAFETY MIRROR SUITABLE FOR MOTOR VEHICLES AND METHOD OF OPERATION

FIELD OF INVENTION

The present invention pertains to dimmable mirrors in general and more specifically to dimmable mirrors which may be used as rearview or side mirrors on motor vehicles, such as trucks and automobiles, and a method of operating such mirrors.

BACKGROUND OF THE INVENTION

During night driving, the vision of a motor vehicle driver may be impaired by headlight glare reflected into his or her eyes by the vehicle's rearview or side mirrors. To alleviate this problem, conventional rearview mirrors in modern automobiles utilize prismatic methods and associated mechanisms to change the mirror from a high reflectance state to a low reflectance or dimmed state. In such a prior art rearview mirror, the dimmed state is achieved under night conditions by pointing a high reflectance surface of the mirror at the dark interior portion of the automobile roof to produce a dark background, while a partially reflective surface of the mirror reflects images from behind the vehicle to the driver's eyes. Thus, in this prior art mirror, the driver effectively sees a dimmed image of the view of objects behind the motor vehicle over a dark background image.

However, these rearview mirrors are incapable of producing a dimmed state in anything but dark conditions. Any ambient light will illuminate the interior roof of the vehicle causing the interior portion of the roof to be visible in the rearview mirror and thereby obstructing the image of the view behind the vehicle. Since prismatic dimmable mirrors cannot operate in a dimmed state without a dark region to which the high reflectance surface can be pointed, these mirrors can not be used as side mirrors located outside of the vehicle. Exterior side mirrors lack a dark region to which the high reflectance surface of the prior art prismatic mirror can be pointed.

Currently, no cost effective technique is utilized on large trucks, classes 6, 7 and 8 to operate a side mirror in a dimmed state. One prior art dimmable mirror technique, which is used in some luxury automobiles, positions an electronically controllable neutral density filter in front of a standard mirror. Two different technologies, electrochromic and dichroic liquid crystal, have been used to implement these electrically dimmable mirrors. However, each one of these technologies has major disadvantages which have limited their use. Solid state electrochromic technology has been used for dimming mirrors. The disadvantages of electrochromic mirrors is that they possess undesirable optical characteristics and are often too expensive for truck and many automobile applications.

Alternatively, dichroic liquid crystal ("LC") technology has been suggested for the manufacture of dimming mirrors that provide good optical characteristics at a reasonable cost. See in this regard U.S. Pat. No. 4,660,937, issued Apr. 28, 1987, to Richardson. However, existing prior art dichroic LC mirrors possess the undesirable characteristic of reverting to a low reflectance state when the electrical power to the mirror has been interrupted. In addition, as a consequence of conventional dichroic LC mirrors' power loss behavior, these dichroic LC mirrors do not meet the safety requirements of the U.S. National Highway Traffic Safety Administration ("NHTSA") for rearview mirrors. The NHTSA safety requirements are set out in 49 CFR §571.111 (1992). The relevant part of this regulation provides:

"All single reflectance mirrors shall have an average reflectance of at least 35 percent. If a mirror is capable of multiple reflectance levels, the minimum reflectance level in the day mode shall be at least: 35 percent and the minimum reflectance level in the night mode shall be at least 4 percent. A multiple reflectance mirror shall either be equipped with a means for the driver to adjust the mirror to a reflectance level of at least 35 percent in the event of electrical failure, or achieve such reflectance level automatically in the event of electrical failure."

Conventional dichroic LC mirrors do not comply with this NHTSA safety requirement because upon failure into a low reflectance state no means have been provided to adjust the failed mirror into a high reflective state as is required by the regulation.

SUMMARY OF INVENTION

An object of the present invention is to provide an improved dimmable mirror possessing good optical characteristics that is suitable for use on or in motor vehicles. Another object of the present invention is to provide a dimmable mirror in compliance with the NHTSA Safety Standard No. 111.

The present invention provides a dimmable safety mirror, suitable for use in automobiles or trucks which comprises a mirror subassembly, a housing and a mounting mechanism to secure the mirror subassembly to the housing in one of two positions. The mirror subassembly comprises a dimmable dichroic LC mirror on one side and a conventional mirror on the opposite side. The housing and mounting mechanism are designed to permit a person to quickly and easily reposition the mirror subassembly to change the viewing surface of the safety mirror from the dimmable mirror surface to the conventional mirror surface.

In normal operation, the mirror subassembly is mounted with the dimmable surface as the viewing surface. Upon power loss to the mirror causing the dimmable mirrors surface to enter a low reflectance state, the mirror subassembly can be repositioned in the housing to make the conventional mirror surface the viewing surface.

Alternative embodiments of the safety mirror utilize two mirrors, a dimmable mirror and a conventional mirror, and a mounting mechanism to operate the safety mirror with either of the two mirrors as the viewing surface.

BRIEF DESCRIPTION OF THE DRAWINGS

FIG. 1A is a side elevational view of a suitable mirror subassembly for an embodiment of the present invention;

FIG. 1B is a front elevational view of a mirror subassembly of FIG. 1A;

FIG. 1C is a rear elevational view of a mirror subassembly of FIG. 1A;

FIG. 4A is an illustration of the components of a detachably mountable dimmable mirror in relation to a conventional mirror, according to an embodiment of the present invention;

FIG. 4B is an illustration of the dimmable mirror of FIG. 4A attached to a conventional mirror;

FIG. 7 is a table of signal operations of a logic control circuit of FIG. 6;

DETAILED DESCRIPTION

Figure 2C:
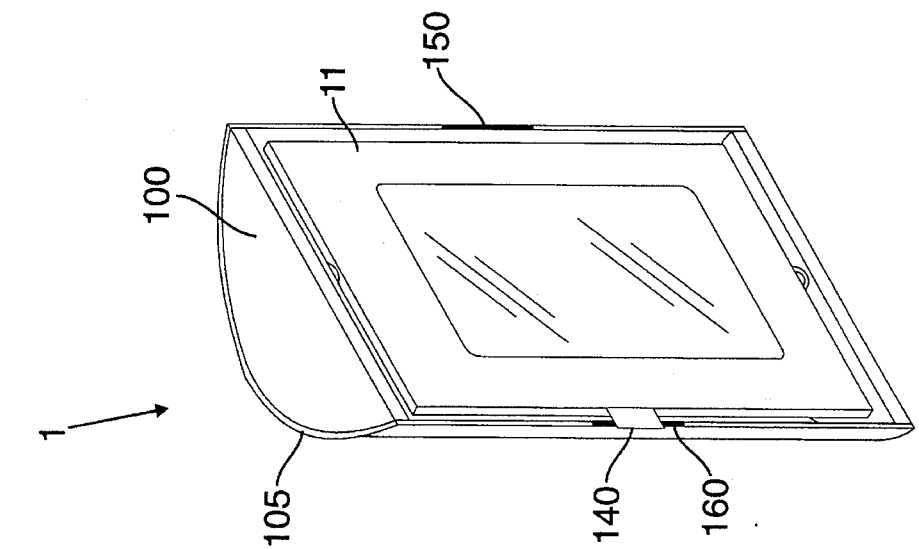
FIG. 2C is an illustration of the dimmable mirror of FIGS. 2A and 2B with the mirror subassembly secured in a second fixed position.

FIGS. 1A–1C depict a mirror subassembly 10 according to one embodiment of the present invention. Referring to FIG. 1A, mirror subassembly 10 has a front transparent nonconductive plate 25 and a rear transparent nonconductive plate 35 which have front and rear surfaces 20 and 30, respectively. Glass is a suitable material for use as the front and rear transparent plates 25 and 35. A reflective surface 75 is coated on an inner surface 36 of rear plate 35. Silver may be used as the coating for the reflective surface 75.

Sandwiched between the front plate 25 and the reflective surface coating 75 on the rear plate 35 are a first transparent conductive layer 45, a layer of dichroic liquid crystal material 55, and a second transparent conductive layer 65. The mirror subassembly 10 is sealed with epoxy around its perimeter, to contain the dichroic liquid crystal material 55 without leakage. The epoxy seal is shown as shadow line 95 in FIG. 1B.

A method of sealing the mirror subassembly 10 with epoxy comprises screen printing a bead, typically in the range of 10–25 mils in width, of heat curable epoxy, such as Abelstik No. 681, around the perimeter of one of the transparent plates 25 or 35. The epoxy is placed on the entire perimeter of the plate, typically 25–75 mils from edges of the transparent plate, except for a small fill area which will be used as a fill opening for the liquid crystal material. The transparent plate 25 or 35 not containing the epoxy bead is coated with glass spacers (not shown) which are 8–12 microns in thickness, and placed on top of the transparent plate with the epoxy bead. The transparent plates 25 and 35 are then compressed and heated for typically 30 to 60 minutes which causes the epoxy bead to spread creating a seal joining and sealing the transparent plates 25 and 35 with a cavity formed therebetween. The cavity is vacuum filled with the liquid crystal material 55 through the open fill area in the epoxy seal. The fill area is then sealed.

One suitable dichroic liquid crystal material 55 is a mixture consisting of a combination of a nematic liquid crystal, an organic dye and a cholesteric dopant. Referring again to FIG. 1A, when no electric field is applied across the liquid crystal material between the first conductor layer 45 and second conductor layer 65, the liquid crystal molecules are in a parallel orientation with respect to the front and rear substrates 25 and 35. Further, the dye molecules orient themselves with their molecular axis parallel to the axis of the nematic crystal molecules in the material 55. In this Orientation, the dye molecules, which are asymmetrical in shape having a long axis and a short axis, absorb a maximum amount of incident light entering the front plate 25, reflecting off the reflective surface 75 and exiting back out through the front plate 25. In this manner, a corresponding low reflectance state having a reflectance in the range of 4% to 15% may be achieved.

Alternatively, when an electric field is applied across the dichroic liquid crystal material 55, the liquid crystal molecules orient themselves such that considerably less light is absorbed. The molecules in the liquid crystal material 55 and the associated dye align with their long axes parallel to the electric field and absorb approximately 30% to 50% of the incident light. Thus, a Corresponding high reflectance state of typically greater than 50% reflectance can be achieved. The manner in which an electric field is applied across the dichroic liquid crystal material 55 is described below with reference to FIG. 1B. The cholesteric dopant in the material 55 adds a twist to the liquid crystal molecules and enhances the contrast between the low reflectance state and the high reflectance state.

FIG. 1B illustrates a front elevational view of the mirror subassembly 10 of FIG. 1A. In FIG. 1B, the dimmable front surface 20 faces out of the drawing. A frame 11 surrounds the perimeter of mirror 10 for protection of the edges of mirror 10 and to facilitate mounting of the mirror subassembly 10. The mirror subassembly 10 has electrically conductive contacts 85 and 90 at opposite corners 21 and 29. The corner 29 of front plate 25 has been cut off providing access to front facing electrical contact 90 which is electrically connected to the second conductive layer 65. Likewise, the corner 21 of rear plate 35 has been cut off providing access to rear facing electrical contact 85 which is electrically connected to the first conductive layer 45 as shown in FIG. 1C. The electrically conductive contacts 85 and 90 are adapted to receive electrical wires which are connected to external drive circuits. The external drive circuits provide the necessary electric field across the dichroic liquid crystal material 55 to operate the dimmable mirror in a high reflectance state.

One suitable method for forming the contacts 85 and 90 is to coat the corners 21 and 29 of the front and rear transparent plates 25 and 35 with a thick film silver amalgamate that is annealed to the front and rear transparent plates 25 and 35 producing silver contacts. The formed silver contacts 85 and 90 provide a surface to which wire connectors can be soldered. Such soldered wires may then be covered with an additional layer of epoxy to provide relief of mechanical strain. Other methods of attachment including conductive epoxies and self adhering conductive contacts may be used.

The front plate 25 may be dip coated with ultra-violet absorbing polysiloxane to protect the dichroic dyes from ultra-violet degradation caused by sunlight. This dip-coating method provides an advantage over the conventional use of laminated plastic ultra-violet filters, which tend to warp and delaminate under the environmental extremes to which a side mirror is subjected. In addition, the dip coat also provides superior optical performance over conventional laminated filters by reducing the number of and the distance between secondary reflective surfaces that cause parallax. For example, the use of a conventional 0.125 inch thick laminated plastic filter adds substantial secondary image reflections to the primary mirror image.

FIG. 1C shows a rear elevational view of mirror subassembly 10. Since reflective surface 75 is coated on the inner surface 36 of rear transparent plate 35, the rear surface 30 of mirror subassembly 10 operates as a conventional mirror. Further, the rear surface 30 will have a reflectance greater than or equal to that of the dimmable surface 20 in its high reflectance state. Thus, the mirror subassembly 10 can be regarded as having dual reflectance, a dichroic LC dimmable mirror for the front surface 20, and a conventional mirror for the rear surface 30.

Figure 2B:
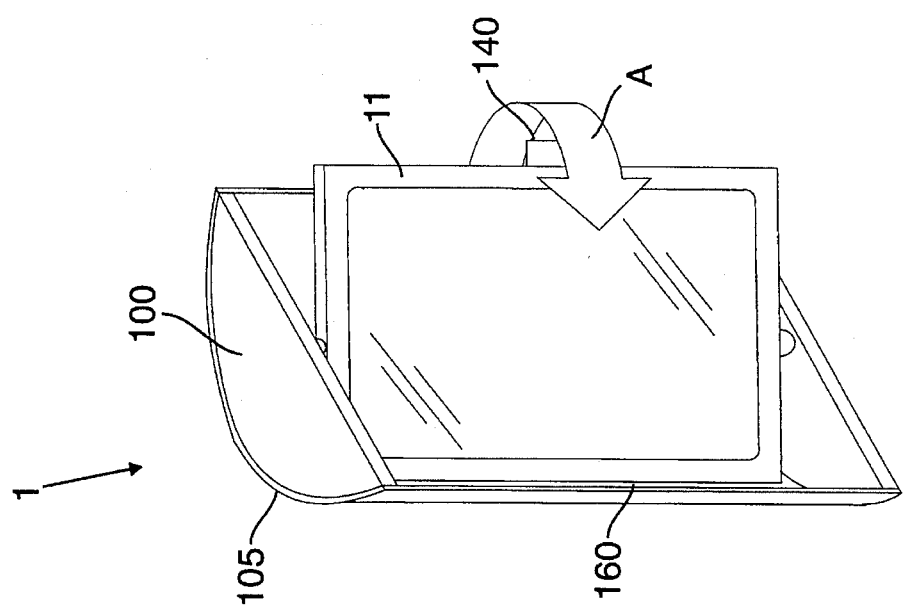
FIG. 2B is an illustration of the dimmable mirror of FIG. 2A showing partial rotation of the mirror subassembly relative to the first fixed position shown in FIG. 2A.
Figure 2A:
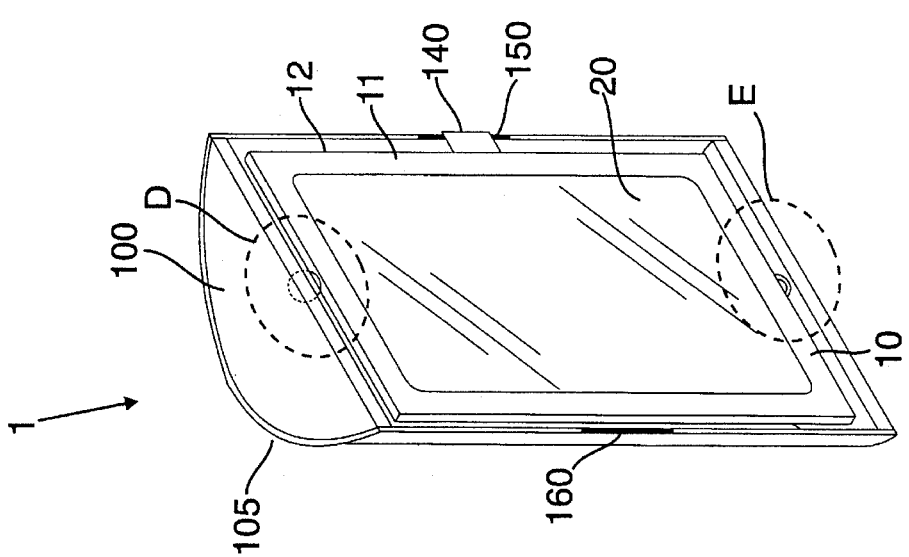
FIG. 2A is an illustration of one embodiment of a dimmable mirror of the present invention having a center shaft rotating assembly and a mirror subassembly secured in a first fixed position.
Figure 2D:
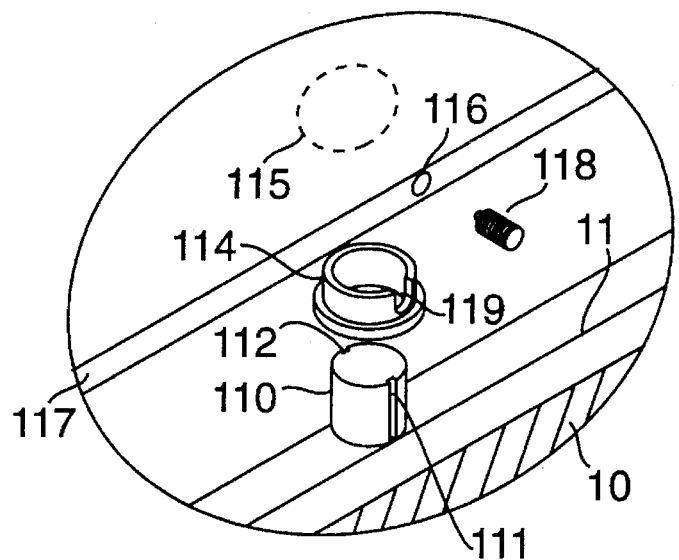
FIG. 2D is an enlarged exploded parts illustration of a top portion of the center shaft rotating assembly of the dimmable mirror of FIG. 2A.
Figure 2E:
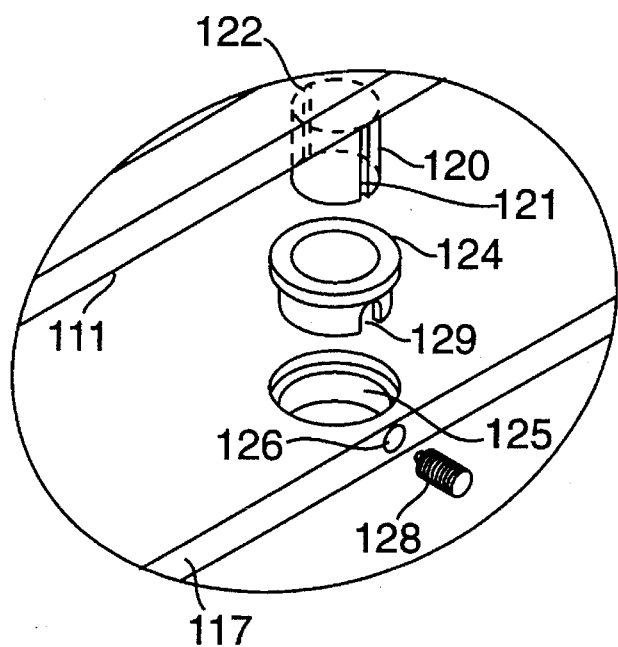
FIG. 2E is an enlarged exploded parts illustration of a bottom portion of the center shaft rotating assembly of the dimmable mirror of FIG. 2A.

FIGS. 2A–2C depict a dimmable safety mirror 1 comprising the mirror subassembly 10 described above with respect to FIGS. 1A–1C, and a mirror housing 100 in a rotating center shaft configuration. FIGS. 2D–2E are an enlarged exploded parts illustration of the regions of safety mirror 1 indicated in FIG. 2A by broken outlines D and E, respectively. Referring to FIGS. 2A, 2D and 2E, the mirror subassembly 10 is rotatably mounted to the housing 100 by top and bottom rods 110 and 120, which extend outwardly from the frame 11 of mirror subassembly 10. The top and bottom rods 110 and 120 engage top and bottom recesses 115 and 125 of housing 100. The top recess 115 is shown by shadow a line in FIG. 2D.

Referring to FIG. 2D, the top rod 110 has first and second diametrically opposed grooves 111 and 112 extending along a radial axis of rod 110. The first groove 111 is substantially aligned with the dimmable mirror front surface 20 of the mirror subassembly 10. Correspondingly, the second groove 112 is substantially aligned with the conventional mirror surface 30 of the mirror subassembly 10. The top rod 110 engages a first collar 114 positioned in the recess 115 of the housing 100. A hole 116 in the housing 100 extends from a front edge 117 through to the recess 115. A first ball plunger detent 118 is disposed in the hole 117 and extends into the recess 115 and a notch 119 in the first collar 114.

Likewise, referring to FIG. 2E, the bottom rod 120 has a first groove 121 extending along its radial axis which is aligned with the dimmable mirror surface 20, and a second groove 122 diametrically opposed from the first groove 121 which is aligned with the conventional mirror surface 30 of the mirror subassembly 10. The bottom rod 120 engages a second collar 124 positioned in the recess 125 of the housing 100. A hole 126 in the housing 100 extends from the front edge 127 through to the recess 126. A second ball plunger detent 128 is disposed in the hole 127 and extends into the recess 125 and a notch 129 in the second collar 124.

In operation, the mirror subassembly 10 can rotate in the housing 100 about the radial axes of the top and bottom rods 110 and 120. The top and bottom rods 110 and 120 rotate within the first and second collars 114 and 124 in the recesses 115 and 125. The ball plunger detents 118 and 128 within the threaded holes 116 and 126 extend into recesses 115 and 125 so as to engage grooves 111 and 112 of the top rod 110, and 121 and 122 of the bottom rod 120, respectively.

When the mirror subassembly 10 is rotated in the housing 100, the ball plunger detents 118 and 128 will engage either first grooves 111 and 121 or second grooves 112 and 122 to secure the mirror subassembly 10 in one of two positions. When the ball plunger detents 118 and 128 engage first grooves 111 and 121, the mirror subassembly 10 will be in a first fixed viewing position with the dimmable mirror surface 20 as the viewing surface of the dimmable safety mirror 1 as shown in FIG. 2A. In the alternative, when the locking screws 118 and 128 engage second grooves 112 and 122, the mirror subassembly 10 will be in a second fixed viewing position with the conventional mirror surface 30 as the viewing surface of the safety mirror 1 as shown in FIG. 2C.

The ball plunger detents 118 and 128 disengage from the grooves 111 and 121 or the second grooves 112 or 122 permitting the mirror subassembly 10 to rotate when a suitable force is applied to an edge of mirror subassembly 10.

Referring to FIGS. 2A–2C, a tab 140 is attached to an edge 12 of mirror subassembly 10. The tab 140 is positioned to assist a driver in changing the viewing surface of the mirror subassembly 10. In FIG. 2A, the tab 140 is shown in a first position near an edge 150 of the housing which positions the mirror subassembly 10 in the first fixed viewing position with its dimmable front surface 20 as the viewing surface. In this position, the ball plunger detents 118 and 128 engage first grooves 111 and 121 of FIGS. 2D and 2E. In FIG. 2C, the tab 140 is shown near an edge 160 of the housing 100 which positions the mirror subassembly 10 in the second fixed viewing position, resulting in conventional mirror surface 30 being the viewing surface. In this position, the ball plunger detents 118 and 128 engage second grooves 112 and 121 of top and bottom rods 110 and 120 as shown in FIGS. 2D and 2E.

In order to change the viewing surface of safety mirror 1 from the dimmable mirror surface 20 to the conventional surface 30, a driver or user applies suitable force to the tab 140 or other portions of the mirror subassembly 10 to release the ball plunger detents 118 and 128 from the first grooves 111 and 121 of the top and bottom rods 110 and 120, and rotates the mirror subassembly 10 in a direction as illustrated by arrow A in FIG. 2B. The mirror subassembly 10 is rotated until the ball plunger detents 118 and 128 engage the second grooves 112 and 122 in the top and bottom rods 110 and 120 as shown in FIG. 2C. In this position, the tab 140 is near the edge 160.

Other means for securing the mirror subassembly.10 in either the first or second fixed positions includes locking detents and corresponding detent receptacles located on the edge of the mirror subassembly 10 and the housing 100. In addition, rotation of the mirror subassembly 10 may also be implemented using a motor or other automatic means, either electrically or mechanically powered, or powered by a combination of electrical and mechanical means. An example of the latter would be a spring loaded system activated when there was a power failure to the mirror subassembly 10. A rear portion 105 of housing 100 should be adequately shaped and sufficiently deep to permit the mirror subassembly 10 to freely rotate in the housing 100 without obstruction.

In normal operation, the mirror subassembly 10 should be positioned so that the dimmable surface 20 is the viewing surface. In this first fixed position, the safety mirror 1 may be operated automatically in the high reflectance state or the low reflectance state, depending upon the intensity of the light impinging upon the viewing surface 20 of the mirror 1. Also, the user may choose to operate the mirror in either the high or low reflectance state, as described below.

The conductive tabs 85 and 90, best seen in FIGS. 1B and 1C, are connected by wires to a voltage source by a control switch (not shown). The control circuit permits selection of the high reflectance state or the low reflectance state of dimmable front surface 20 and may be fully manual, or semi-automatic or fully automatic as discussed below with reference to FIG. 5. The wires may be disposed within or proximate the center rods 110 and 120 so as to avoid tangling when the viewing position of the mirror is changed.

In the event of a malfunction causing loss of power to mirror subassembly 10 and thereby reversion of the dimmable surface 20 to the low reflectance state, the driver can manually rotate the mirror subassembly 10 as shown in the sequence of FIGS. 2A–2C in order to reposition it with the conventional mirror surface 30 as the viewing surface. Thus, the present invention conforms with the NHTSA Safety Standard No. 111, because it provides a means for a driver to adjust the mirror into a high reflectance state in the event of an electrical failure. Upon restoration of electrical power to the mirror subassembly 10, the driver can rotate the mirror subassembly 10 from the conventional mirror surface 30 to the dimmable surface 20.

In addition, the present invention provides a safer alternative to those conventional electrically dimmable mirrors relying on backup or secondary power sources, e.g., batteries and solar cells. Dimmable mirrors relying on secondary power sources pose a safety risk because the secondary power source can also fail causing the mirror to enter a low reflective state. The present invention circumvents this safety risk by providing a mechanical means to switch the viewing surface from the failed dimmable mirror to a conventional high reflectance mirror.

Figure 3C:
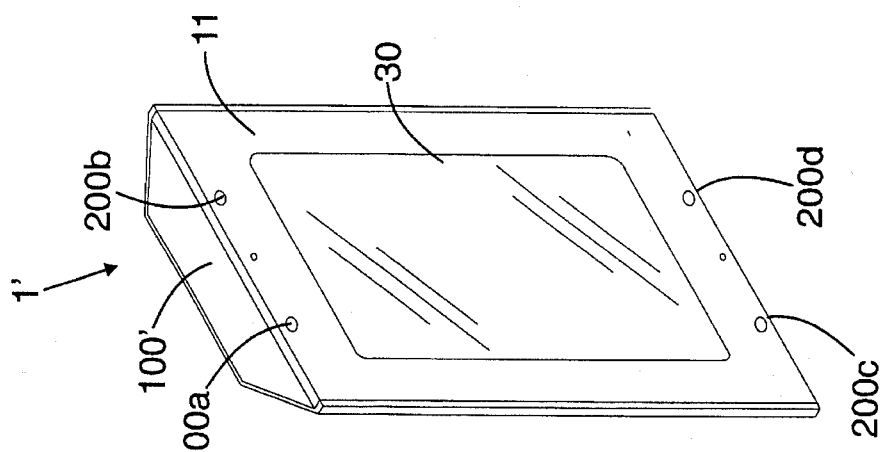
FIG. 3C is an illustration of the dimmable mirror of FIGS. 3A and 3B with the mirror subassembly secured in a second fixed position.
Figure 3B:
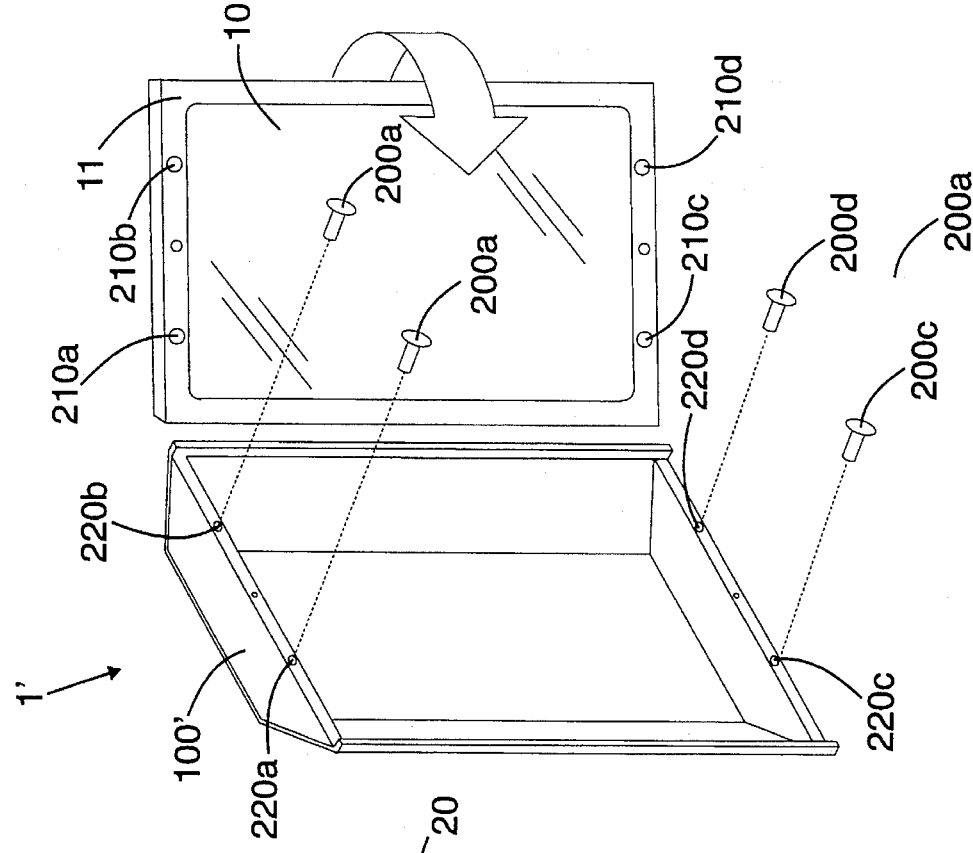
FIG. 3B is an illustration of the dimmable mirror of FIG. 3A showing a detached partial rotation of the mirror subassembly relative to the first fixed position shown in FIG. 3A.
Figure 3A:
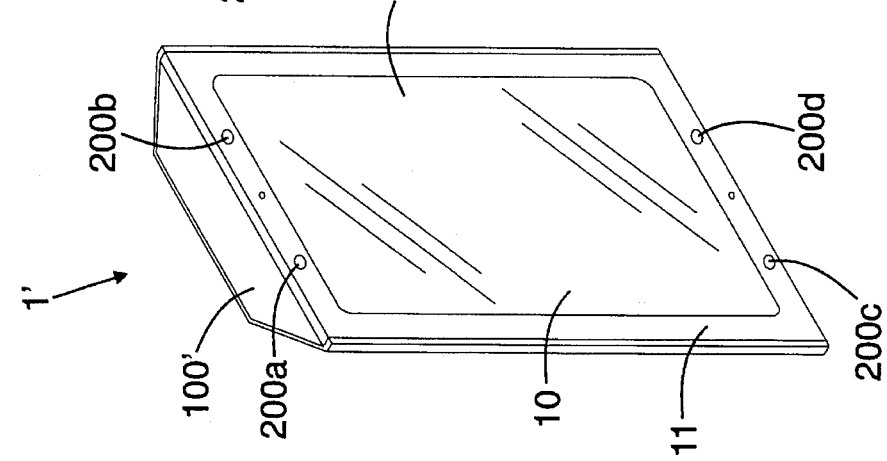
FIG. 3A is an illustration of another embodiment of a mirror of the present invention having a quick-releasing fastener assembly and a mirror subassembly attached in a first fixed position.

An alternative embodiment of the present invention is a safety mirror 1' with a detachable assembly as shown in FIGS. 3A–3C. In FIG. 3A, the mirror subassembly 10, which is the same as the mirror subassembly utilized in the embodiment shown in FIGS. 1–2, is secured to a housing 100' by quick-releasing fasteners 200a–200d. The frame 11 of mirror subassembly 10, has holes 210a–210d (best seen in FIG. 3B), which are symmetrically aligned with fastener anchoring holes 220a–220d in housing 100'. Fasteners 200a–200d are inserted in symmetrically positioned holes 210a–210d of mirror subassembly 10 and engage fastener anchoring holes 220a–220d in housing 100' to securely hold mirror subassembly 10 to housing 100'. The holes 210a–210d and 220a–220d should be symmetrically aligned to permit mirror subassembly 10 to be secured to the housing 100' in either a first fixed position shown in FIG. 3A, or a second fixed position shown in FIG. 3B.

In normal operation, the mirror subassembly 10 is secured to the housing 100' in the first position with the dimmable mirror surface 20 as the viewing surface. In this position, the safety mirror 1' can be switched from a high reflectance state to a low reflectance state automatically or by a control switch (not shown) located in the vehicle.

Upon an electrical failure causing the mirror to revert to its low reflectance state, the mirror subassembly 10 can be removed from the housing 100' by removing the quick-releasing fasteners 200a–200d as shown in FIG. 3B. The mirror subassembly 10 can then be rotated and refastened to the housing 100' in the second fixed position with the conventional mirror surface 30 as the viewing surface as shown in FIG. 3C. The driver refastens the mirror subassembly 10 to the housing 100' by insertion of the quick-releasing fasteners 200a–200d.

Numerous other configurations of the present invention utilizing the mirror subassembly 10 can be envisioned by those skilled in the art from this description. For example, one contemplated embodiment of the present invention incorporates a slidably detachable mirror subassembly, wherein the mirror subassembly 10 would slide in and out of grooves within the mirror housing. Upon a failure causing the dimmable surface to enter a low reflection state, the driver would slide the mirror subassembly 10 out of the housing, rotate the mirror subassembly 10 and slide it back into position with the conventional mirror surface 30 as the viewing surface.

In another contemplated embodiment, a rotating assembly is provided which eliminates the need for the mirror housing. In such a configuration, the mirror subassembly 10 is rotatably attached to the mounting brackets that secure the safety mirror to the vehicle. A cover panel is used to cover the surface of the mirror subassembly 10 that is not being used as the viewing surface. The covered surface would face forward of the vehicle. In normal operation, with the dimmable mirror surface 20 being used as the viewing surface, the cover would be attached to the conventional mirror surface 30 of the mirror subassembly Upon a failure of the dimmable mirror, the mirror subassembly is rotated 180 degrees and the cover panel is removed to expose the conventional mirror surface. The conventional mirror surface 30 is now in position for use as the viewing surface and the cover panel is placed over the failed dimmable mirror surface 20.

Furthermore, the use of a dual reflective mirror subassembly 10 is not necessary to practice the present invention. A housing and mechanism of the present invention may utilize two mirrors, a dimmable mirror and a conventional mirror, and means for positioning either of the two mirrors as the viewing surface of the safety mirror. One contemplated embodiment of such a mirror positions a dimmable mirror in front of a conventional mirror in a housing. Upon a failure of the dimmable mirror, the driver would slide the failed mirror out of the housing, leaving the conventional mirror exposed.

In an alternative embodiment, a conventional mirror is rotatably mounted and positioned behind a dimmable mirror whereby upon a failure of the dimmable mirror, the conventional mirror can be rotated from behind the dimmable mirror to cover the dimmable mirror.

In addition, the present invention may be utilized with pre-existing mirrors by incorporating a mounting mechanism that secures a dimmable mirror to, and in front of, the pre-existing mirror. Upon a failure of the dimmable mirror, it may easily be removed to make the pre-existing conventional mirror as the viewing surface. One embodiment of such a device is a clip-on dichroic liquid crystal rearview mirror as shown in FIGS. 4A–4B.

In FIGS. 4A–4B, a conventional rearview mirror 300 is shown that is part of or attached to a motor vehicle (not shown) in a conventional manner. A dimmable dichroic liquid crystal mirror 310, which is substantially the same size as mirror 300, is detachably mounted to a face 301 of the conventional mirror 300 by removable U-shaped brackets 320 and 330. Operational elements of dimmable dichroic liquid crystal mirror 310 are substantially similar to those of mirror subassembly 10 shown in FIGS. 1A–1C, except that dimmable mirror 310 does not have a corresponding conventional mirror rear surface as surface 30 of the mirror subassembly 10. The brackets 320 and 330 have retaining adjustment screws 325 and 335, respectively.

Installation of the dimmable mirror 310 consists of sliding the fixed bracket 330 and attached mirror 310 over an end 302 of the motor vehicle's conventional mirror 300 as shown in FIG. 4A. The removable U-shaped bracket 320 is then fastened to the dimmable mirror 310 over the conventional mirror 300 as shown in FIG. 4B. The adjustment screws 325 and 335 are hand tightened to hold the dimmable mirror 310 in place. Once installed, dimmable mirror 310 is used by the driver for viewing objects behind the vehicle.

Upon a loss of power causing the dimmable mirror 310 to enter its low reflection state, the driver can remove the dimmable 310 by loosing adjustment screws 325 and 335, detaching the removable bracket 320 and sliding the dimmable mirror 310 off of the conventional mirror 300. Thereby, the conventional mirror 300 once again may be used for viewing objects behind the vehicle.

Further, power may be provided to the dimmable mirror 310 via wires electrically connected to the motor vehicles electrical system. In the alternative, U-shaped bracket 320 may be adapted to contain replaceable batteries (not shown) for the dimmable mirror 310 while U-shaped bracket 330 may be adapted to contain electronic control circuitry for dimmable mirror 310. Wires originating from the control circuitry are connected to the mirror 310 and the battery and may be routed through the U-shaped bracket 330 and through a bezel of dimmable mirror 310. The mirror wires can then be connected to the mirror 310 by a suitable method, such as the contact pad configuration of the safety mirror 10 in FIGS. 1A–1C.

The battery wires in the bezel of mirror 310 which originate from the control circuit connect to slide contacts (not shown) on the bezel proximate the connection point of removable bracket 320. The removable bracket 320 has corresponding slide contacts which mate with those of mirror 310 when the bracket 320 is attached. The batteries contained within U-shaped bracket 320 are electrically connected to the slide contacts on the bracket 320.

A disadvantage of prior art battery-powered LC dimmable mirrors has been a short operating life due to the continuous power consumption of maintaining the mirror in its high reflection state. For example, the most efficient prior art battery-powered LCD mirror would deplete two AA lithium batteries in approximately one to two months, i.e., 720 to 1440 hours. In order to extend the operating life, the electronics of the dimmable mirror 310 of FIGS. 4A–4B may contain a passive motion detector sensor 430 as shown in FIG. 5.

Figure 5:
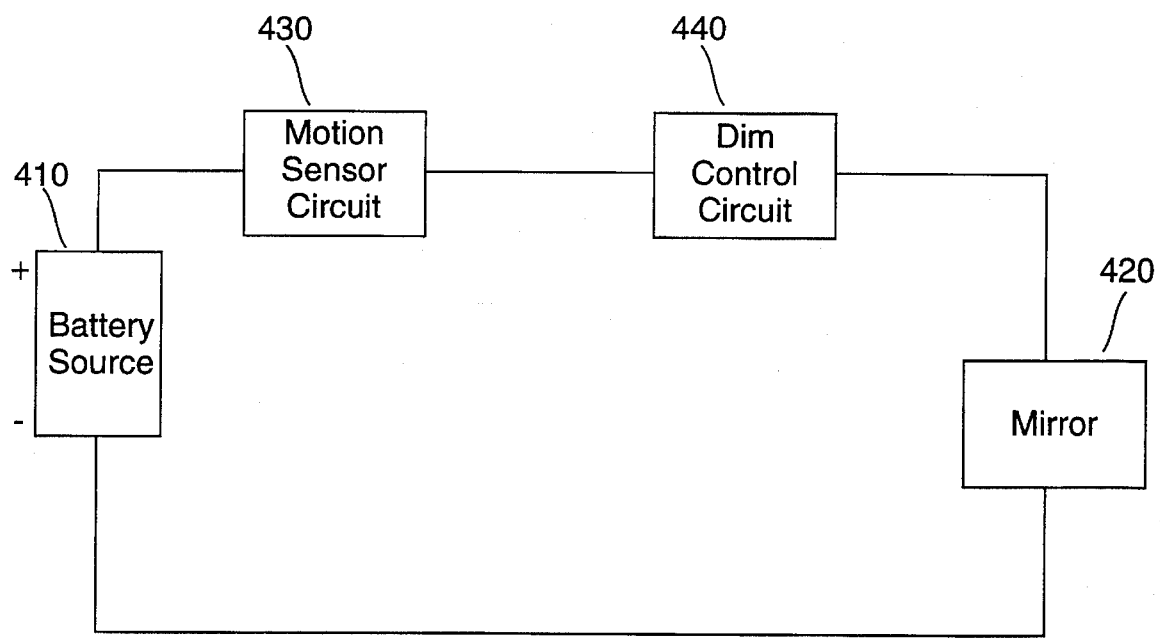
FIG. 5 is a schematic representation of an efficient battery-powered dimmable mirror circuit according to the present invention.

In FIG. 5, a battery source 410 is connected to a dimable mirror 420, such as dimmable mirror 310 shown in FIGS. 4A–4B, via the motion sensor circuit 430 and dimming control circuit 440. The motion sensor circuit 430 may make use of a passive mechanical type motion sensor. Typical motion sensor of this type consists of a mercury droplet or metal ball that rolls over multiple electrical contacts when moved. A low-power circuit monitors the state of electrical shorting of the electrical contacts and detects vibration or motion by changes in the state of electrical shorting of these electrical contacts.

In operation, when vibration or motion is not detected for an extended period of time, e.g., fifteen minutes, the motion sensor circuit 430 disconnects the battery source 410 from the dimming control circuit 440 and the mirror 420. When a sufficient level of vibration is detected, the motion sensor circuit 430 connects the battery source 410 to the mirror 420 and dim control circuit 440.

The sensitivity of the motion detector circuit 430 can be selected to provide power to the mirror upon door openings, driver entry, and doors closing, as well as vibrations caused by acceleration, deceleration, or motor vibration. The purpose of the motion detector 430 is to only power the mirror when the motor vehicle is occupied and operating. Therefore, since typically most cars are operated approximately 500 hours out of a year (8,760 hours), life expectancy of a battery should be greater than one year. This aspect of the present invention provides a significantly more efficient dimmable battery-powered mirror than found in prior art mechanisms.

All the embodiments listed above may incorporate dimming control electronics, such as circuit 440 of FIG. 5, to provide fully manual, semi-automatic or fully automatic means of switching between the high reflectance state and low reflectance state of the dimmable mirror. In a fully manual system, a driver activated switch is used to select high or low reflectance states.

In a dimmable mirror having a semi-automatic system, a driver selectable switch is provided to select day or night operation. In day operation, the dimmable mirror is maintained in its high reflectance state. In night operation, the electronics automatically dim the mirror anytime headlights or other bright light is detected. In a dimmable mirror with a fully automatic dimming system the electronics further determine whether day or night conditions exist.

Figure 6:
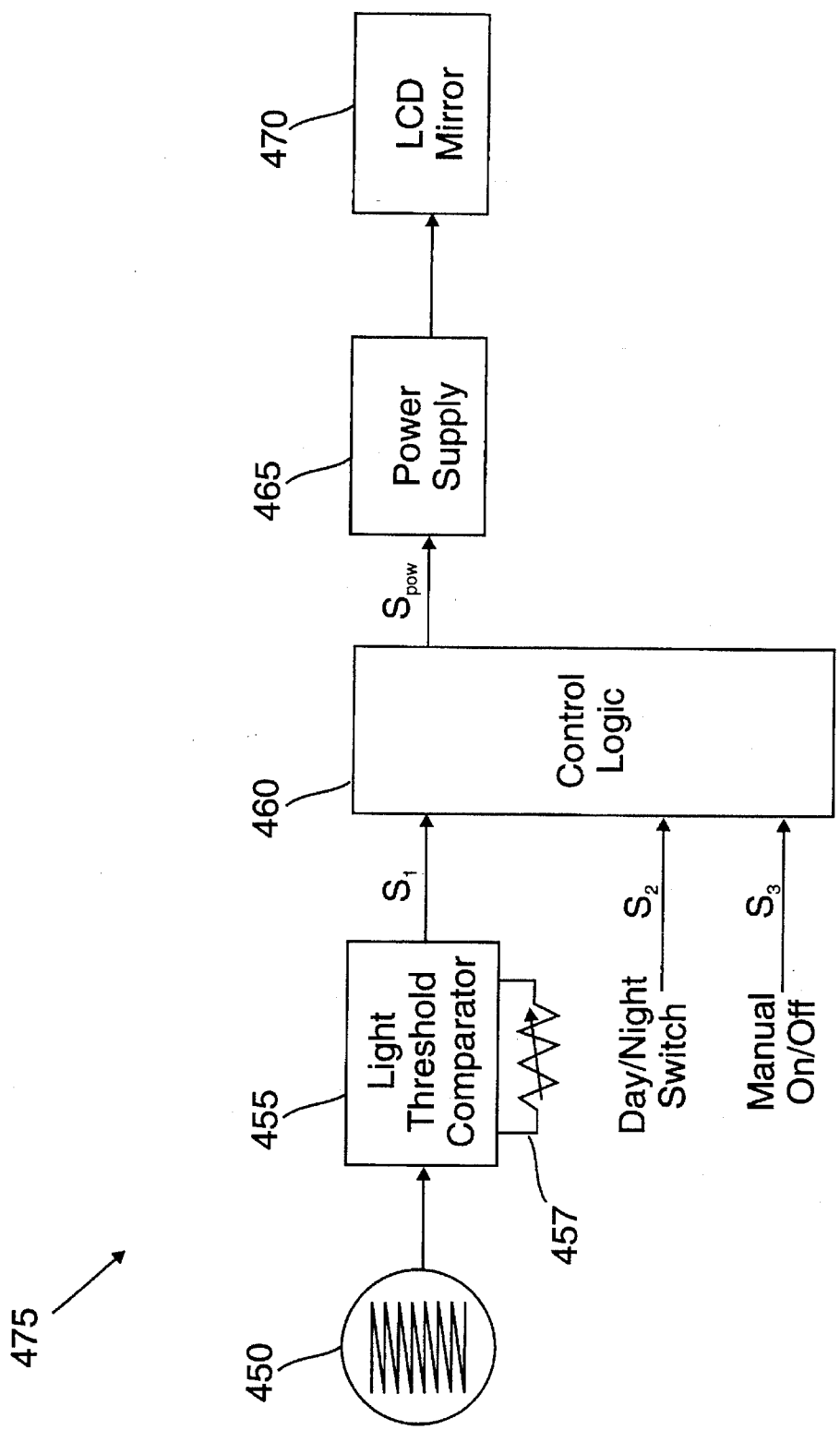
FIG. 6 is a schematic representation of a suitable circuit for a semi-automatic dim control circuit of FIG. 5.

A suitable semi-automatic control circuit 475 for use as dim control circuit 440 is shown in FIG. 6. In FIG. 6, a photo sensor 450 is connected to a light threshold comparator 455 which generates the signal $S_1$ which is applied to suitable control logic circuit 460. The light threshold comparator 455 may also be connected to an optional sensitivity adjustment device, such as potentiometer 457. The control logic 460 is adapted to receive input signals $S_2$ and $S_3$ which are generated based on the position of a day/night toggle switch and a manual toggle switch (not shown) respectively. The toggle switches are located within reach of the motor vehicle operator. The control logic 460 generates an output signal $S_{pow}$ based on the input signals $S_1$-$S_3$ according to the table of FIG. 7. The output signal $S_{pow}$ is applied to a power supply 465. The power supply 465 is further connected to a dimmable mirror 470, such as dimmable mirror 310 of FIG. 5.

A suitable device for power supply 465 is a DC to AC converter connected to a battery to produce a required 15–25 $V_{rms}$ to maintain a dichroic LC mirror in a bright state.

In operation, the photo sensor 450 and threshold comparator 460 detects the presence or absence of headlight glare and generates and output $S_1$ accordingly. An optical sensitivity adjustment 457 may be utilized to adjust the sensitivity of light threshold comparator 455. The control logic circuit 460 output signal $S_{pow}$ controls the power supply 465 to cause dimmable LC mirror 470 to enter its high or low reflectance states.

The control logic circuit 460 generates $S_{pow}$ based on signals $S_1$-$S_3$ in the relationship shown in FIG. 7. For example, when manual switch output signal $S_3$ is in a manual dim mode, $S_{pow}$ is generated such that mirror 470 is dimmed independent of the state of signals $S_2$ and $S_3$. Further, when manual switch output signal $S_3$ is not in a manual dim mode and day/night switch output signal $S_2$ corresponds to the day position, $S_{pow}$ will be generated to maintain mirror 470 in its high reflectance state. Lastly, when signal $S_3$ is not in a manual dim mode and day/night switch output signal is in a night mode, the output signal $S_{pow}$ will be generated to dim mirror 470 when the light threshold comparator signal $S_1$ is in a glare detected state, otherwise $S_{pow}$ will maintain mirror 470 in a high reflectance state.

Figure 8:
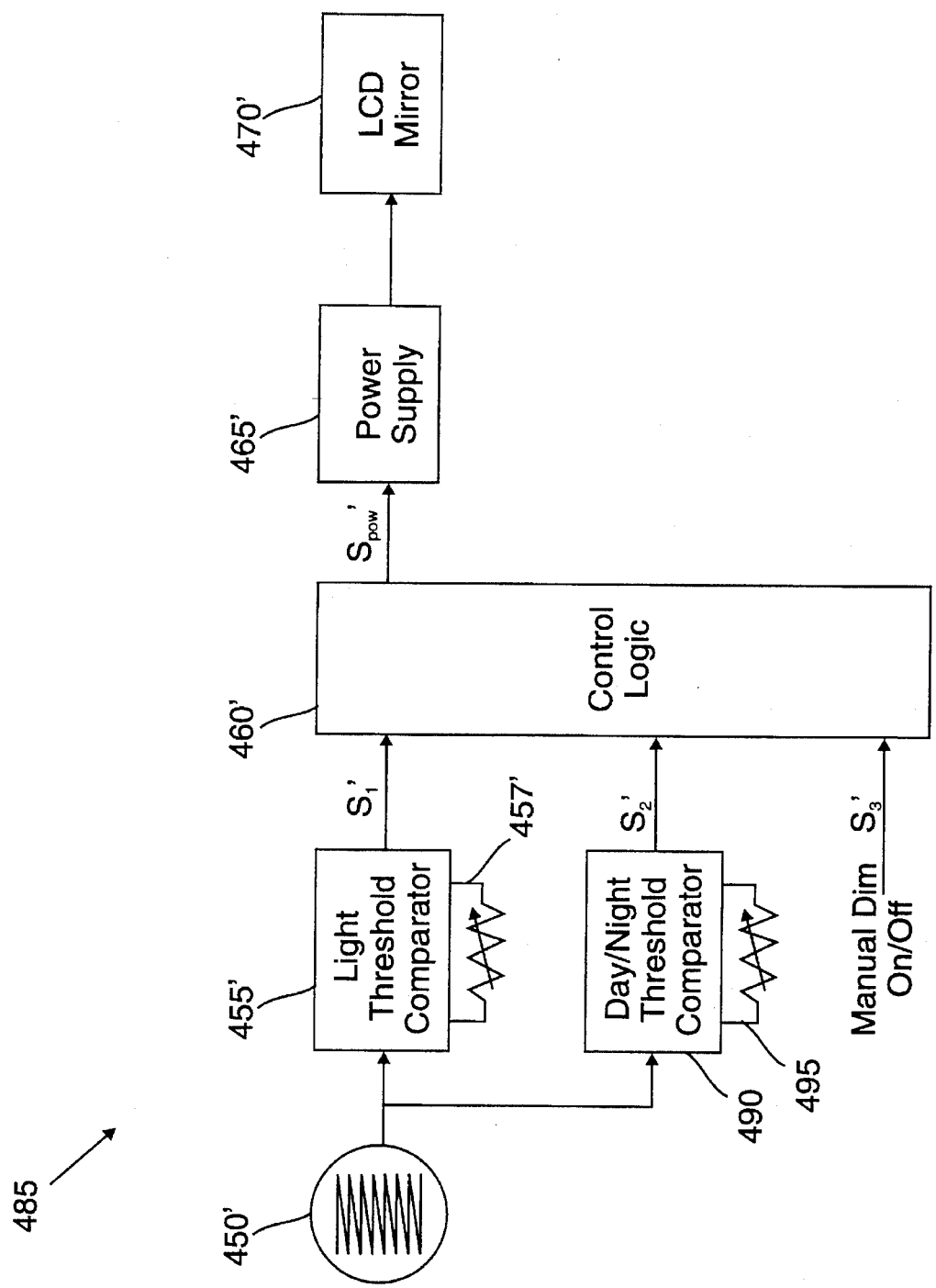
FIG. 8 is a schematic representation of a suitable circuit for an automatic dim control circuit of FIG. 5.

FIG. 8 depicts a suitable fully automatic circuit 485 for dim control circuit 440 of FIG. 5. In FIG. 8, the block components for an automatic dim control circuit 485 are substantially identical to and operate in substantially the same manner to the semi-automatic dim control circuit 475 of FIG. 6 with one modification. In FIG. 8, similar component blocks to those of FIG. 6 are indicated with a '. For example, logic control circuit 460' corresponds generally to logic control circuit 460. The difference between the automatic control circuit 485 of FIG. 8 and semi-automatic control circuit 475 of FIG. 6 concerns the generation of a signal $S_2$' indicating day or night mode.

The circuit 485 utilizes a more sophisticated photo sensor 450' and a day/night light threshold comparator 490 to detect day or night conditions and to generate the signal $S_2$'. The comparator 490 replaces the day/night switch depicted in FIG. 6. The comparator 490 is connected to the photo sensor 450'. In addition, an optional sensitivity adjustment circuit 495, such as a potentiometer, may be connected to the comparator 490.

In operation, the generation of signals $S_1$', $S_3$' and $S_{pow}$' by the respective blocks occurs by the same operation that produces signals $S_1$, $S_3$ and $S_{pow}$ of FIG. 6. The control logic 460' may contain the identical boolean operations as those contained in control logic circuit 460 which are governed by the table of FIG. 7. However, automatic control circuit 485, automatically determines the day/night mode by measuring the magnitude of ambient light with photo sensor 450' and comparing it to a predetermined threshold in comparator 490. The sensitivity may be adjusted by varying the threshold with an optional adjustment circuit 495. Thereby, circuit 485 operates in substantially the same manner as circuit 475 without requiring the motor vehicle operator to manually select day or night mode operation.

In yet another embodiment, the control electronics of the dimmable mirror are connected to associated electrical components of the vehicle to activate automatically the safety mirror 1 or 1' to operate in a high reflectance state when a reverse gear of the vehicle's transmission engaged.

The frame 11 of mirror subassembly 10 shown in FIGS. 1B–1C may incorporate environment protection elements which protect the mirror subassembly 10 from damage by the environmental extremes to which a motor vehicle mirror is subjected. A dichroic LC mirror should be shock mounted to withstand the severe vibrations caused by shuddering and general harsh-ride of large trucks and other motor vehicles which would damage the mirror subassembly 10. A dichroic mirror should also be mounted in a water tight frame to prevent exposure of the LC mirror epoxy seal to road-salt and moisture from humidity or rain. Moisture tends to permeate the epoxy seal which would eventually cause the LC mirror to malfunction. In addition, the LC mirror should possess a heater to maintain the liquid crystal within their normal range of operating temperatures of above 0° C.

Figure 9:
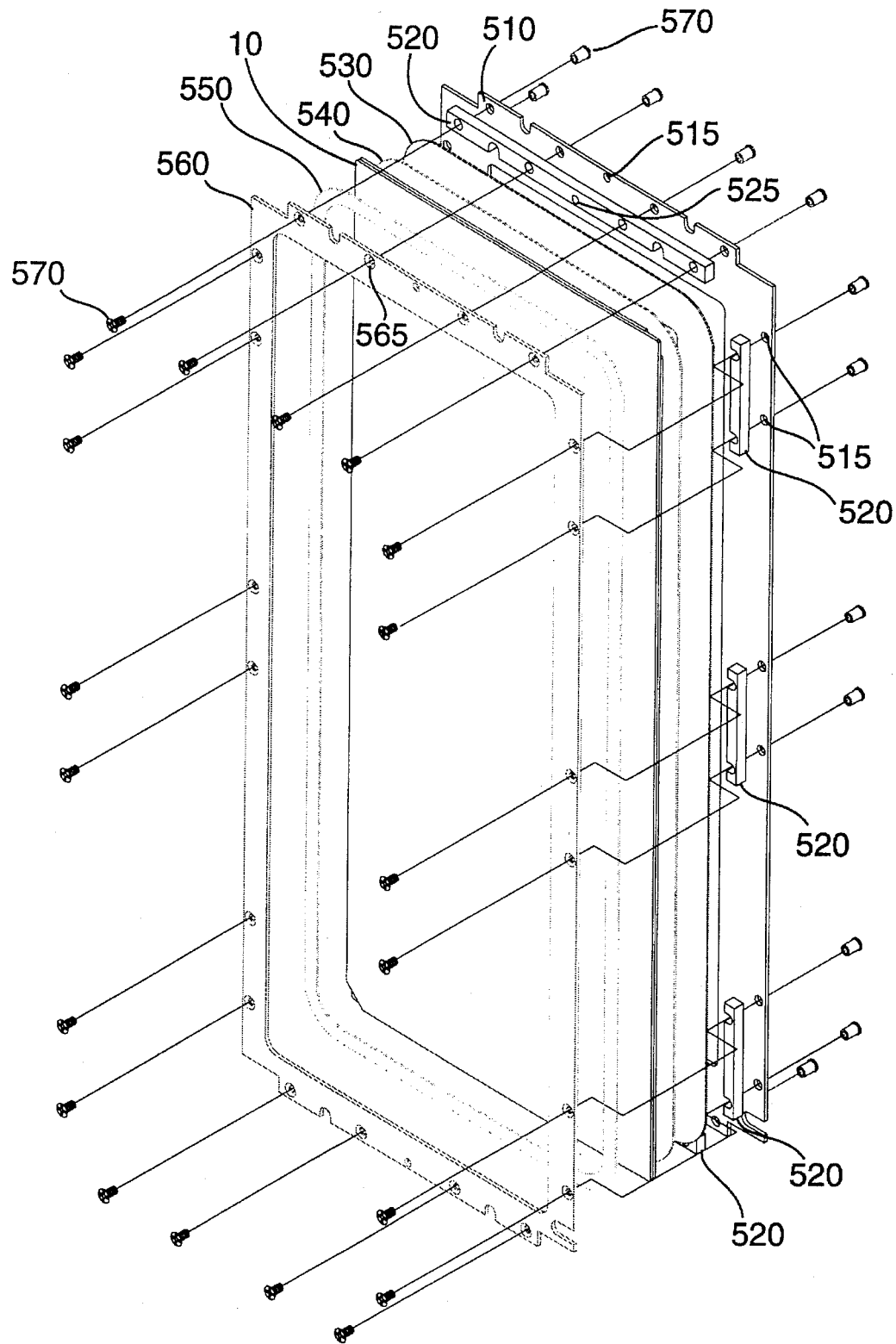
FIG. 9 is an exploded parts isotropic view of a suitable environment protection frame for the mirror subassembly of the present invention.

An environment protection frame assembly 500 for use with the mirror subassembly 10 according to the present invention is shown in FIG. 9. The frame assembly 500 provides suitable protection from vibration, wet weather and temperature extremes that are typical in an environment in which a motor vehicle safety mirror would operate. In FIG. 9, a plurality of components are positioned adjacent to each to form the protective frame assembly 500. The plurality of components comprises: a rear frame 510, standoffs 520, rear gasket 530, electrical perimeter heater strip 540, the mirror subassembly 10, a front gasket 550 and a front frame 560.

The rear frame 510, standoffs 520 and front frame 560 contain a like-positioned plurality of holes 515, 525 and 565, respectively. When the components of the environment protection frame 500 are sandwiched together, the holes 515, 525 and 565, are aligned to permit insertion of screws 570 and threaded receptacles 580 to secure the rear frame 510 to the front frame 560. When the components of the environment frame assembly 500 are secured together, the rear gasket 530, the perimeter heater strip 540, mirror subassembly 10 and front gasket 550 are held tightly together between the standoffs 520 and front frame 560. In addition, the rear frame 510 and front frame 560 may be larger than the other components to form a channel between the frames 510 and 560 and outer edges of the interior components for the entire perimeter of the assembled protection frame 500.

Figure 10:
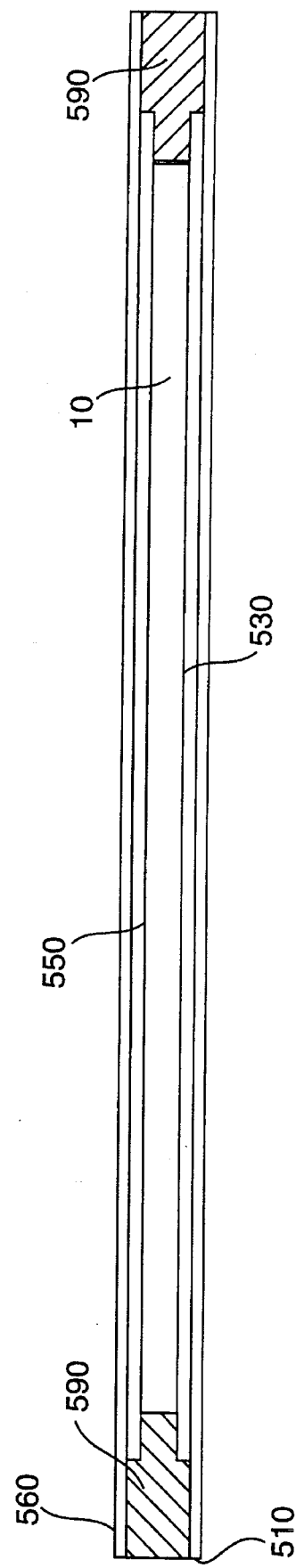
FIG. 10 is a cross-sectional view of the assembled environment protection frame of FIG. 9.

FIG. 10 is a cross-sectional view of an assembled protection frame 100. In FIG. 10, the channel between the rear frame 510 and front frame 560 which is filled with a silicone elastomer potting compound 590. The silicone compound 590 totally encapsulates the edges of the mirror subassembly 10, including the contact areas 85 and 90, shown in FIGS. 1B and 1C, preventing any moisture from reaching subassembly epoxy seal or electrical contacts. The silicone compound 590 provides the added advantage of increased shock and vibration resistance of the protection frame assembly 500. Alternatively, if the rear and front frames 510 and 560 are not larger than the interior components an a assembly 500 no perimeter channel will be formed. In such an assembly, the silicone compound may be coated on the perimeter edges to provide the protection from the environment.

The perimeter heater strip 540 of frame assembly 500 maintains the liquid crystal mirror at operational temperatures, as well as, providing de-icing in cold weather. The perimeter heater strip 540 permits the majority of the rear surface of mirror subassembly 10 to be used as the conventional mirror surface. Since the perimeter heater strip 540 allows the rear surface of the mirror subassembly 10 to be used as a mirror, it provides an advantage over typical mirror heaters which are merely opaque coatings covering the entire rear surface of the mirror.

Electrical power to the perimeter heater strip 540 is controlled by a conventional thermal relay (not shown) located in the safety mirror housing, such as housing 100 shown in FIGS. 2A–3C. The thermal relay connects electrical power to the heater 540 when temperatures are below freezing. A switch may be added in the motor vehicle to override the thermal relay and turn power off to heater 540.

The present invention is not limited to the embodiments described above and may be utilized with any dimmable type mirror which reverts to a low reflectance state upon power loss or other type of failure. Any type of dimmable mirror can be utilized as a safety mirrors according to the present invention by incorporating a suitable mounting mechanism to permit the changing of the viewing surface from the dimmable mirror to a conventional mirror upon loss of power or other malfunction causing the dimmable mirror to enter its low reflectance state. Therefore, all types of dimmable mirror which may fail to a low reflectance state can provide a measure of safety and comply with the NHTSA Safety Regulation No. 111, if configured in a safety mirror according to the present invention.

I claim:

1. A dimmable safety mirror for use in motor vehicles having a viewing surface comprising:

a mirror subassembly comprising a dimmable front reflective surface and a rear reflective surface, said dimmable front surface being selectively switchable between a high reflectance state and a low reflectance state, and said rear reflectance surface being a high reflectance mirror;

a housing; and a mounting mechanism to secure said mirror subassembly to said housing in either a first position wherein the front surface of said mirror subassembly is the viewing surface or a second position wherein said rear surface of said mirror subassembly is the viewing surface of the safety mirror.

2. The dimmable safety mirror of claim 1, wherein the mirror subassembly is mounted in said housing in said first position and upon a malfunction causing the dimmable front surface to enter said low reflectance state, the mirror subassembly is switched to said second position.

3. The dimmable safety mirror of claim 1, wherein the mounting mechanism comprises:

a first rod fixed to and extending out of an edge of said mirror subassembly; and a second rod fixed to and extending out of an opposite edge of said mirror subassembly, wherein the first and second rods engage first and second recesses in said housing such that the mirror subassembly may rotate in said housing between said first and said second positions about an axis formed along said rods.

4. The dimmable safety mirror of claim 3, wherein rotation of the mirror subassembly is accomplished by manual, motorized or other automatic operations.

5. The dimmable safety mirror of claim 3, further comprising:

a detent located on an edge of said mirror subassembly which engages one of a first or second detent receptacle in the housing to secure said mirror subassembly in said first or second position.

6. The dimmable safety mirror of claim 3, further comprising:

a first and second detent located in the housing proximate the first and second rods to engage detent receptacles in the rods so as to secure the mirror in its first or second position.

7. The dimmable safety mirror of claim 1, wherein the securing mechanism comprises symmetrically positioned quick release fasteners which engage symmetrically positioned holes in the mirror subassembly and housing to secure the mirror subassembly in either the first or second position.

8. A dimmable safety mirror having a viewing surface comprising:

a housing;

a mirror subassembly mounted in said housing, the mirror subassembly comprising a front dimmable reflective surface and a rear reflective surface, the front dimmable reflective surface switchable between at least a high reflectance state and a low reflectance state; and a mechanism for securing the mirror subassembly to the housing either in a first position with the front dimmable surface as the viewing surface, or in a second position with the rear reflective surface as the viewing surface.

9. The dimmable safety mirror of claim 8, wherein the securing mechanism rotatably mounts the mirror subassembly to said housing by a first rod fixed to and extending out of an edge of said mirror subassembly and a second rod fixed to and extending out of an opposite edge of said mirror subassembly, wherein the first and second rods engage first and second recesses in said housing such that the mirror subassembly may rotate in said housing between said first and said second positions about an axis formed along said rods.

10. The dimmable safety mirror of claim 9, wherein first and second detents engage detent receptacles in the first and second rods to secure said mirror subassembly in either said first or second position.

11. The dimmable safety mirror of claim 8, wherein the securing mechanism detachably slidably mounts the mirror subassembly to said housing.

12. The dimmable safety mirror of claim 8, wherein the securing mechanism comprises:

symmetrically positioned quick release fasteners which engage symmetrically positioned holes in the mirror subassembly and housing to secure the mirror subassembly in either the first or second position.

13. A dimmable safety mirror having a viewing surface comprising:

a housing;

a liquid crystal mirror subassembly mounted in said housing, the mirror subassembly comprising a front dimmable reflective surface and a rear reflective surface, the front dimmable reflective surface switchable between at least a high reflectance state and a low reflectance state; and a mechanism for securing the mirror subassembly to the housing either in a first position with the from dimmable surface as the viewing surface, or in a second position with the rear reflective surface as the viewing surface.

14. The dimmable safety mirror of claim 13, wherein the front surface of said mirror subassembly is a dichroic liquid crystal mirror and said rear surface is a conventional mirror.

15. The dimmable safety mirror of claim 14, wherein the dimmable front surface will operate in the high reflectance state when power is provided to the mirror subassembly and the low reflectance state when the mirror subassembly is unpowered.

16. The dimmable safety mirror of claim 15, wherein the mirror subassembly comprises:

front and rear transparent nonconductive plates arranged adjacent one another, wherein an inner-facing surface of the front plate faces an inner-facing surface of the rear plate;

a reflective surface coated on the inner-facing surface of the rear plate;

a first transparent conductive layer disposed on the inner-facing surface of the front plate;

a second transparent conductive layer disposed on the reflective surface such that it faces the first conductive layer; and a dichroic liquid crystal material disposed between the first and second conductive layers.

17. The dimmable safety mirror of claim 16, wherein the mirror subassembly further comprises:

a first electrically conductive pad electrically connected to said first conductive layer; and a second electrically conductive pad electrically connected to said second conductive layer, the first and second pad being positioned and adaptable for electrical connections to provide power to the mirror subassembly.

18. The dimmable safety mirror of claim 16, wherein the mirror subassembly further comprises:

a protective frame surrounding a perimeter of the multi-layered structure.

19. A dimmable safety mirror for use in motor vehicles having a viewing surface comprising:

an electrically powered mirror subassembly comprising a dimmable front reflective surface and a rear reflective surface, said dimmable front surface having more than one reflectance level and said rear reflectance surface having a high reflectance mirror;

a housing: and means for adjusting the mirror subassembly within the housing to a high reflectance state in the event of electrical failure, wherein said rear reflectance surface of said mirror subassembly is the viewing surface of the safety mirror.

20. The dimmable safety mirror of claim 19 wherein the front surface of said mirror subassembly is a dichroic liquid crystal mirror which is in a high reflectance state when power is applied to said mirror subassembly and is in a low reflectance state when power is removed from said mirror subassembly.

* * * * *